United States Patent [19]

Namikoshi

[11] Patent Number: 4,520,192
[45] Date of Patent: May 28, 1985

[54] CARBOXYALKYL ACETYL CELLULOSES, THEIR SALTS AND A PROCESS FOR THE PREPARATION OF THEM

[75] Inventor: Hajime Namikoshi, Himeji, Japan

[73] Assignee: Daicel Chemical Industries Ltd., Osaka, Japan

[21] Appl. No.: 627,418

[22] Filed: Jul. 3, 1984

[51] Int. Cl.³ .............................................. C08B 13/00
[52] U.S. Cl. ....................................................... 536/66
[58] Field of Search ......................................... 536/66

[56] References Cited

U.S. PATENT DOCUMENTS

| 2,664,397 | 12/1953 | Hutchinson | 536/66 |
| 2,912,430 | 11/1959 | Kosche | 536/66 |
| 3,789,117 | 1/1974 | Tsujino | 536/66 |

FOREIGN PATENT DOCUMENTS

| 1126244 | 9/1968 | United Kingdom | 536/66 |

*Primary Examiner*—Ronald W. Griffin
*Attorney, Agent, or Firm*—Hubbell, Cohen, Stiefel & Gross

[57] ABSTRACT

A carboxyalkyl acetyl cellulose having a degree of substitution (DS) by the carboxyalkyl group per anhydroglucose unit of 0.2–2.5 and a degree of substitution (DS) by acetyl group per anhydroglucose unit of 0.5–2.8, the alkyl in the carboxyalkyl group being a $C_{1-3}$ alkyl, and a salt thereof, and a process for the preparation of carboxyalkyl acetyl celluloses by acetylating an alkali metal salt of a carboxyalkyl cellulose having a degree of substitution by the carboxyalkyl group per anhydroglucose unit of 0.2–2.5, after converting it into the acid-form by treatment with an aqueous acid solution, with acetic anhydride in the presence of catalyst to obtain a carboxyalkyl acetyl cellulose having a degree of substitution by the carboxyalkyl group per anhydroglucose unit of 0.2–2.5 and a degree of substitution by acetyl group per anhydroglucose unit of 0.5–2.8, and if needed converting it into the corresponding salt.

7 Claims, 1 Drawing Figure

CARBOXYALKYL ACETYL CELLULOSES, THEIR SALTS AND A PROCESS FOR THE PREPARATION OF THEM

BACKGROUND OF THE INVENTION (1) Field of the Invention

The present invention relates to novel carboxyalkyl acetyl celluloses having a high degree of substitution by the carboxyalkyl group and acetyl group per anhydroglucose unit (hereinafter each "degree of substitution" means that per anhydroglucose unit), their salts and a process for the preparation of them.

(2) Description of the Prior Art

There are a few reports on carboxyalkyl acetyl celluloses. As to carboxyalkyl acetyl celluloses whose carboxyalkyl groups are of acid-form, their use as an enteric coating agent, relying on their solubility in organic solvents and their solubility in intestines, is described (Japanese Patent Publication No. 35393/1971. It is disclosed that said carboxalkyl acetyl celluloses have a degree of substitution by the carboxyalkyl group of 0.3–1.2. However, there is given no disclosure as to the degree of substitution by acetyl group of such carboxyalkyl acetyl celluloses and the process for the preparation of them. Further, a process for the acetylation of carboxymethyl cellulose (British Pat. No. 1,126,244) and an instance of acetylation using a large amount of acetic anhydride in the presence of catalyst, after an alkali cellulose is reacted with monochloroacetic acid, (U.S.S.R. Inventor's Certificate Specification No. 612933) are known. These acetylation processes, however, have such defects that the acetyl groups eliminated in the course of the reaction or a large amount of acetic anhydride is required. Carboxyalkyl acetyl celluloses obtained by the former process are very low in their degree of substitution by the carboxyalkyl group, and those obtained by the latter process are very low in their degree of substitution by acetyl group. Carboxyalkyl acetyl celluloses having a high degree of substitution by both carboxyalkyl group and acetyl group are not known as yet.

SUMMARY OF THE INVENTION

The inventors of the present invention have, after extensive investigation of the process for the preparation of carboxyalkyl acetyl celluloses, succeeded in preparing novel carboxyalkyl acetyl celluloses having a high degree of substitution by both carboxyalkyl group and acetyl group.

Thus, the present invention provides carboxyalkyl acetyl celluloses having a degree of substitution (DS) by the carboxyalkyl group of 0.2–2.5 and a degree of substitution (DS) by acetyl group of 0.5–2.8 and their salts.

The present invention provides also a process for the preparation of carboxyalkyl acetyl celluloses characterized by acetylating an alkali metal salt of a carboxyalkyl cellulose having a degree of substitution by the carboxyalkyl group of 0.2–2.5, after converting it into the acid-form by treatment with an aqueous acid solution, with acetic anhydride in the presence of catalyst to obtain a carboxyalkyl acetyl cellulose having a degree of substitution by the carboxyalkyl group of 0.2–2.5 and a degree of substitution by acetyl group of 0.5–2.8, and if needed converting it into the corresponding salt.

DESCRIPTION OF THE PREFERRED EMBODIMENT

Figure 1:
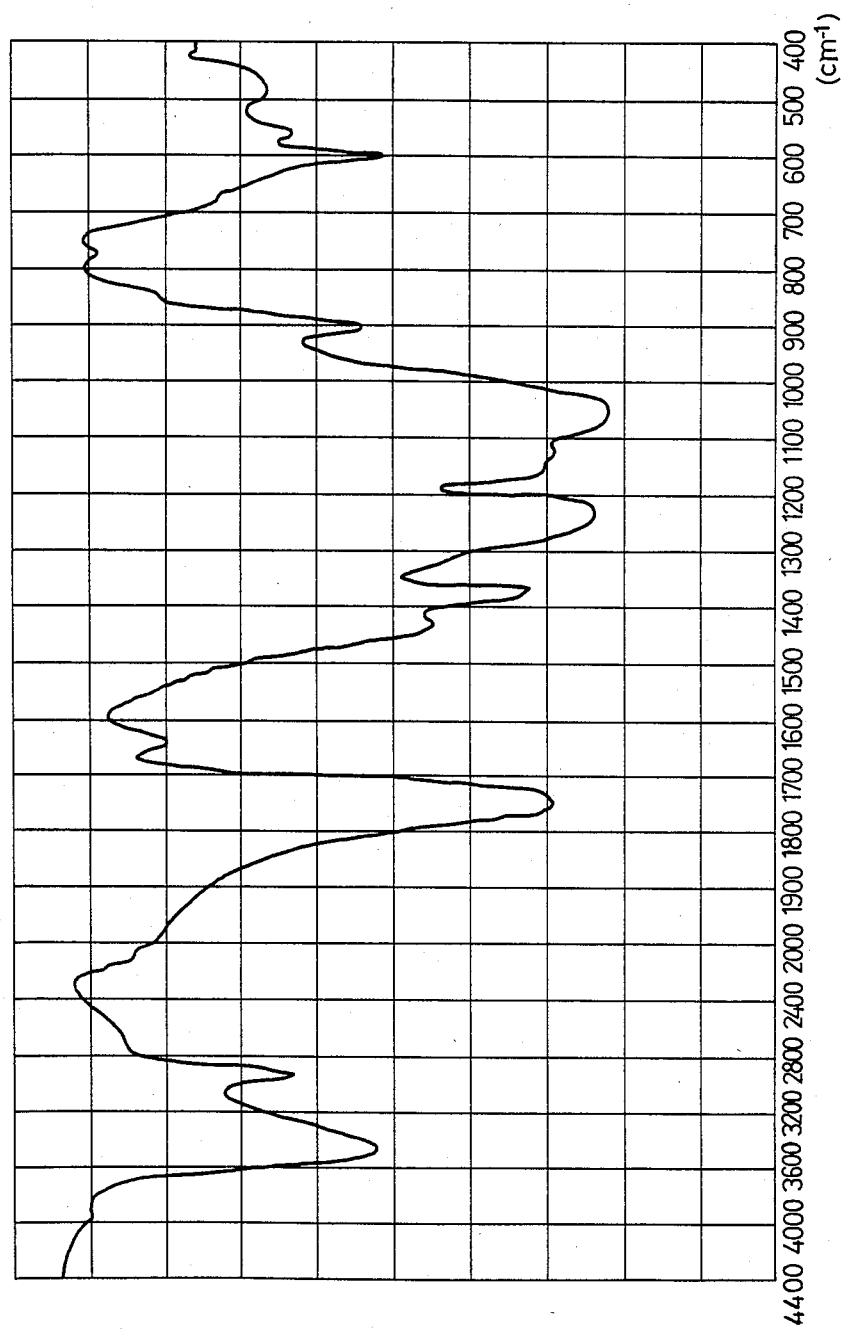
FIG. 1 shows an infrared absorption spectrum of the acid-form of carboxymethyl acetyl cellulose obtained by the below Example 1.

The alkyl group of the carboxyalkyl group of the carboxyalkyl acetyl celluloses of the present invention include lower alkyl groups of about $C_{1-3}$. The salts of the carboxyalkyl acetyl celluloses of the present invention include the sodium salt, potassium salt, calcium salt and ammonium salt.

The carboxyalkyl acetyl celluloses (acid-form) obtained by acetylation with acetic anhydride using sulfuric acid as catalyst are insoluble in water or an aqueous lower alkyl alcohol containing a large amount of water, though they are dissolved uniformly in acetone or methylene chloride/methanol. On the other hand, the sodium salts of such carboxyalkyl acetyl celluloses are dissolved uniformly in water, an aqueous lower alkyl alcohol containing a large amount of water of an aqueous acetone containing a large amount of water, though they are insoluble in a mixture of methylene chloride/methanol. Therefore, such acid-form of carboxyalkyl acetyl celluloses may be used as an enteric coating agent, in view of their solubility in organic solvents.

As the alkali metal salts of the carboxyalkyl celluloses used as the starting material of the process of this invention, there can be mentioned sodium salt and potassium salt. Those carboxyalkyl celluloses having a degree of substitution by the carboxyalkyl group within the same range as that of the degree of substitution by carboxyalkyl group of the carboxyalkyl acetyl celluloses, i.e. the final products of the present invention, may be used as the starting material. Not only powdery ones, such as a commercially available sodium carboxymethyl cellulose (sodium CMC), but also fibrous ones may be used.

As the acid to be used for converting the carboxyalkyl cellulose into acid-form, a mineral acid such as sulfuric acid, hydrochloric acid, niric acid or the like, or an organic acid such as acetic acid may be used in the form of its aqueous solution. The reaction for converting into acid-form is usually effected at room temperature.

To enhance the efficiency of the acetylating agent such as acetic anhydride, it is desirable to dehydrate the acid-form of carboxyalkyl cellulose as far as possible with acetic acid or the like. Any remaining mineral acid does not come into question as far as it does not affect the acetylation reaction.

As the acetylating agent, acetic anhydride is used mainly.

As the catalyst for the acetylation reaction, sulfuric acid, sulfoacetic acid, perchloric acid, zinc chloride or the like may be used. The acetylation reaction is performed at a slightly elevated temperature, that is, at 40°–60° C.

When the salt (for example, sodium salt or ammonium salt) is wanted, it can be prepared easily by reacting the acid-form of carboxyalkyl acetyl cellulose dissolved in an organic solvent with the corresponding alkali (for example, an aqueous solution of sodium hydroxide or ammonium hydroxide).

The invention is further explained in detail by giving Examples. However, the invention shall never be limited to these Examples.

The determination of the degree of substitution (DS) by carboxymethyl group and the degree of substitution (DS) by acetyl group, of carboxymethyl acetyl celluloses in the following Examples was effected according to the following methods (1) Degree of substitution in acid-type carboxymethyl acetyl celluloses Approximately 1 g of an acid-type carboxymethyl acetyl cellulose is weighed accurately (true amount $m_1$ g) and added to a mixture of 70 ml of acetone and 30 ml of water. Then, titration is effected instantly with 1/10N NaOH using phenolphthalein as indicator.

$V_1$ ml: the amount of 1/10N NaOH used
$f_1$: factor of 1/10N NaOH
x: DS by carboxymethyl
y: DS by acetyl $$\frac{V_1 f_1}{100 \text{ ml}} = \frac{x}{162 + 58x + 42y} = A$$

Next, approximately 1 g of the acid-form carboxymethyl acetyl cellulose is weighed accurately (true amount $m_2$ g) and dissolved in 150 ml of 1/10N NaOH. The solution is left to stand at room temperature for one day and night, and then the excessive NaOH is titrated with 1/10N $H_2SO_4$ using phenolphthalein as indicator.

$V_2$ ml: the amount of 1/10N $H_2SO_4$ used
$f_2$: factor of 1/10N $H_2SO_4$ $$\frac{150 f_1 - V_2 f_2}{10000 m_2} = \frac{x + y}{162 + 58x = 42y} = B$$

From the above simultaneous equations, the following equations are derived to calculate x and y:

$$x = \frac{162A}{1 - 16A - 42B}$$

$$y = \frac{162(B - A)}{1 - 16A - 42B}$$

(2) Degree of substitution in sodium salt of carboxymethyl acetyl celluloses

Approximately 1 g of a sodium salt of carboxymethyl acetyl cellulose is weighed accurately (true amount $m_1$ g), placed into a porcelain crucible and ashed at 600° C. The sodium oxide formed by the ashing is neutralized with 100 ml of 1/10N $H_2SO_4$, and then the excessive $H_2SO_4$ is titrated with 1/10N NaOH using phenolphthalein as indicator.

$V_1$ ml: the amount of 1/10N NaOH
$f_1$: factor of 1/10N NaOH
$f_2$: factor of 1/10N $H_2SO_4$
x': DS by carboxymethyl
y': DS by acetyl $$\frac{100 f_2 - f_1 V_1}{10000 \text{ ml}} = \frac{x'}{162 + 80x' + 42y'} = A$$

Next, approximately 1 g of the sodium salt of carboxymethyl acetyl cellulose is weighed accurately (true amount $m_2$ g) and dissolved in 150 ml of 1/10N NaOH. The solution is left to stand for one day and night, and then the excessive NaOH is titrated with 1/10N $H_2SO_4$ using phenolphthalein as indicator.

$V_2$ ml: the amount of 1/10N $H_2SO_4$ used $$\frac{150 f_1 - V_2 f_2}{10000 m_2} = \frac{y'}{162 + 80x' + 42y'} = B$$

From the above simultaneous equations, the following equations are derived to calculate x' and y':

$$x' = \frac{162A}{1 - 80A - 42B},$$

$$y' = \frac{162B}{1 - 80A - 42B}.$$

EXAMPLE 1

In 1.5 kg of 20% sulfuric acid were dipped 50 g of sodium CMC (DS 0.63) at room temperature for 2 hours. After washing with water, the water was well substituted by acetic acid. After removing well the liquid, the resultant was placed into a small kneader and 250 g of acetic acid, 5.6 g of sulfuric acid and 150 g of acetic anhydride were added thereto. The reaction was performed at 48°–50° C. for 4 hours. As the reaction proceeded, sodium CMC was dissolved. The reaction mixture was then poured into water, and the precipitate formed was separated, washed well with water and dried under vacuum to obtain the acid-form of carboxymethyl acetyl cellulose.

A part of the sample of the above product was dissolved in acetone, neutralized by adding 0.5N sodium hydroxide solution dropwise and dried by suction with a rotary evaporator to give the sodium salt.

As to the sodium carboxymethyl acetyl cellulose thus obtained, the degree of substitution by carboxymethyl group and that by acetyl group were determined according to the titration-after-ashing method and the saponification method, respectively. DS by carboxymethyl group was 0.63 and DS by acetyl group was 2.34. Solubilities in solvents were as follows:

|  | sodium salt | acid-form |
| --- | --- | --- |
| water | dissolved uniformly | insoluble |
| methanol | dissolved uniformly when 5% or more of water is contained | insoluble |
| ethanol | dissolved uniformly when 20% or more of water is contained | insoluble |
| isopropanol | dissolved uniformly when 30% or more of water is contained | insoluble |
| acetone | dissolved when 20% or more of water is contained | dissolved uniformly |
| methylene chloride/ ethanol = 9/1 | insoluble | dissolved uniformly |

An infrared absorption spectrum of the acid-form carboxymethyl acetyl cellulose obtained by this Example is shown in FIG. 1.

COMPARATIVE EXAMPLE 1

In 1 kg of acetic acid were dipped 50 g of sodium CMC (DC 0.63) at room temperature for 2 hours. After removing the liquid well, the resultant was placed in a small kneader and 250 g of acetic acid, 15.3 g of sulfuric acid and 15 g acetic anhydride were added thereto. The reaction was performed at 48°–50° C. for 4 hours. Even after the time passed, sodium CMC was not dissolved in acetic acid. After the time passed over, the solid matter was separated by filtration, washed well with water and dried under vacuum.

The sample thus obtained showed the same infrared absorption spectrum as the acid-form of CMC, and its degree of substitution by acetyl group was less than 0.1 as determined by the saponification method after conversion into sodium salt.

EXAMPLE 2

In 1.5 Kg of 20% sulfuric acid were dipped 50 g of sodium CMC (DS 0.65) at room temperature for 2 hours. After washing with water, the water was well substituted by acetic acid. After removing well the liquid, the resultant was placed in a small kneader and 84 g of acetic acid, 316 g of methylene chloride, 210 g of acetic anhydride and 1.5 g of sulfuric acid were added thereto. The reaction was performed at 48°–50° C. for 6 hours. As the reaction proceeded, sodium CMC was dissolved. The reaction mixture was then poured into water, and the precipitate formed was separated, washed well with water and dried under vacuum to give the acid-form of carboxylalkyl acetyl cellulose.

A part of the sample was dissolved in acetone, neutralized with 0.1 N sodium hydroxide solution and then dried under reduced pressure by means of a rotary evaporator to give the sodium salt.

The degree of substitution of the sodium carboxymethyl acetyl cellulose thus obtained was DS 0.59 for carboxymethyl group and DS 2.19 for acetyl group. Solubilities in solvents were as follows:

|  | sodium salt | acid-type |
|---|---|---|
| water | dissolved uniformly | insoluble |
| methanol | dissolved uniformly when 20% or more of water is contained | insoluble |
| ethanol | dissolved uniformly when 50% or more of water is contained | insoluble |
| isopropanol | dissolved uniformly when 50% or more of water is contained | insoluble |
| acetone | dissolved when 25% or more of water is contained | dissolved uniformly |
| methylene chloride/ ethanol = 9/1 | insoluble | dissolved uniformly |

EXAMPLE 3

In 500 g of 20% sulfuric acid were dipped 16.7 g of sodium CMC (DS 0.64) at room temperature for 2 hours. After removing the liquid and washing with water, the water was well substituted by acetic acid. After removing the liquid, the resultant was mixed with 350 g of toluene. On the other hand, 1.27 g of sulfuric acid were added to 60 g of acetic anhydride and heated at 70° C. for 15 minutes to convert the sulfuric acid into sulfoacetic acid. The acid mixture so obtained was then mixed with the above mixture of CMC and toluene, and the reaction was performed at 50° C. for 6.5 hours.

After removing the liquid matter, the reaction product was well treated with methanol, washed with water and then dried.

As determined by the same methods as used in Example 1, the degree of substitution of the product was DS 0.64 for carboxymethyl group and DS 1.73 for acetyl group. The acid-form product was insoluble in acetone.

EXAMPLE 4

In 500 g of 20% sulfuric acid were dipped 17 g of sodium CMC (DS 0.65) at room temperature for 2 hours. After removing the liquid and washing with water, the water was well substituted by acetic acid. After removing the liquid, to the resultant were added 250 g of acetic acid, 39 g of acetic anhydride and 14 g of zinc chloride. The reaction was performed at 60° C. for 7 hours. The reaction mixture was then poured into 1000 g of 5% aqueous sodium chloride solution, and the precipitate formed was separated, washed with water and dried. As determined by the same methods as used in Example 1, the degree of substitution of the product was DS 0.63 for carboxymethyl group and DS 2.23 for acetyl group. The acid-form product was not dissolved uniformly in acetone.

What is claimed is:

1. A process for the preparation of carboxyalkyl acetyl cellulose having a degree of substitution (DS) by the carboxyalkyl group per anhydroglucose unit of 0.2–2.5 and a degree of substitution (DS) by the acetyl group per anhydroglucose unit of 0.5–2.8 and a salt thereof, the alkyl in the carboxyalkyl group being a $C_{1-3}$ alkyl, comprising converting an alkali metal salt of a carboxyalkyl cellulose having a degree of substitution by the carboxyalkyl group per anhydroglucose unit of 0.2–2.5 into its acid-form by treatment with an aqueous acid solution, and then acetylating the acid-form of the carboxyalkyl cellulose with acetic anhydride in the presence of a catalyst at 40°–60° C.

2. A process as claimed in claim 1, further comprising converting the carboxyalkyl acetyl cellulose into its corresponding salt.

3. A process as claimed in claim 1, wherein the salt is sodium salt, potassium salt, calcium salt or ammonium salt.

4. A process as claimed in claim 1, wherein an aqueous solution of a mineral acid or an organic acid is used for converting the alkali metal salt of the carboxyalkyl cellulose into its acid-form.

5. A process as claimed in claim 4, wherein the mineral acid is selected from a group consisting of sulfuric acid, hydrochloric acid and nitric acid.

6. A process as claimed in claim 4, wherein the organic acid is acetic acid.

7. A process as claimed in claim 1, wherein the catalyst is sulfuric acid, sulfoacetic acid, perchloric acid or zinc chloride.

* * * * *